United States Patent [19]

Peaster

[11] Patent Number: 4,738,476

[45] Date of Patent: Apr. 19, 1988

[54] FLEXIBLE COUPLING FOR FLUID DUCTS

[75] Inventor: Bertram A. Peaster, Marietta, Ga.

[73] Assignee: Lockheed Corporation, Calabasas, Calif.

[21] Appl. No.: 672,938

[22] Filed: Nov. 19, 1984

[51] Int. Cl.⁴ ............................................. F16L 55/00
[52] U.S. Cl. ..................................... 285/178; 285/13; 285/184; 285/233
[58] Field of Search ................. 285/13, 184, 223, 224, 285/233, 224, 349, 178

[56] References Cited

U.S. PATENT DOCUMENTS

| | | | |
|---|---|---|---|
| 1,880,098 | 9/1932 | Mair | 285/184 |
| 2,918,313 | 12/1959 | Lazar et al. | 285/349 |
| 2,967,723 | 1/1961 | Willis | 285/233 |
| 2,971,781 | 2/1961 | Torres | 285/233 |
| 3,002,771 | 10/1961 | Chakroff | 285/233 |
| 3,596,934 | 8/1971 | De Cenzo | 285/233 |
| 3,669,472 | 6/1972 | Nadsady | 285/233 |
| 3,695,644 | 10/1972 | Goldberg | 285/233 |
| 3,737,179 | 6/1973 | White, Jr. | 285/184 |
| 4,135,742 | 1/1979 | Anderson | 285/233 |
| 4,436,326 | 3/1984 | Peaster | 285/178 |

FOREIGN PATENT DOCUMENTS

| | | | |
|---|---|---|---|
| 649602 | 10/1962 | Canada | 285/233 |
| 559966 | 9/1923 | France | 285/184 |
| 661137 | 11/1951 | United Kingdom | 285/184 |

Primary Examiner—Cornelius I. Husar
Assistant Examiner—Eric K. Nicholson
Attorney, Agent, or Firm—Eric R. Katz

[57] ABSTRACT

A fluid coupling accommodates misalignments of ducts to be connected in any one or any combination of three basic directions, these being axial, angular and radial. The coupling also provides for duct flexibility while minimizing the number of necessary sealing elements.

5 Claims, 9 Drawing Sheets

Fig_2

Fig_3

Fig_4

Fig_5

Fig_ 6

FLEXIBLE COUPLING FOR FLUID DUCTS

TECHNICAL FIELD

The present invention generally relates to flexible couplings for fluid ducts and more particularly to a coupling for accomodating misalignments of ducts to be connected as well as for providing duct flexibility: i.e., movement between coupled ducts, to compensate for structural deflections while minimizing the number of necessary sealing elements of the coupling.

BACKGROUND ART

When ducts are aligned and fixed to one another, a sound structural joint can be achieved with several known types of couplings. However, as is often the case, when ducts are misaligned, these known couplings are difficult to assemble and require excessive force to prevent leakage. This force often causes fatigue failures in service.

In order to overcome the deficiencies of the prior, known couplings, the inventor of the present invention disclosed in U.S. Pat. No. 4,436,326, assigned to the assignee of the present invention, a flexible coupling that is adjustable to accommodate misalignment of ducts to be connected in any one or any combination of three basic directions, viz. axial, radial, and angular. The coupling also permits conical flexibility to a substantial degree, i.e., on the order of about ±3° to about ±4°. This flexibility, the angular movement of the ducts relative to one another within the assembled coupling, is provided to permit float between ducts relative to one another to compensate for attaching structural deflections.

A typical example of such deflections is the movement of an aircraft wing and/or engine in flight. Thus, the flexibility of the above-noted coupling permits movement between connected ducts, such as fuel and hydraulic lines or ducts, when the aircraft is in operation thereby eliminating the buildup of stresses which can result in leakages and structural failures.

While operationally quite efficient, this coupling necessitated the incorporation of either four or five elastomeric seals, thus increasing the opportunity for leakage. Additionally, the assembly of this coupling is somewhat complicated increasing the probability of incorrect assemblage of parts.

DISCLOSURE OF THE INVENTION

It is, therefore, an object of the present invention to provide a flexible coupling for fluid ducts that is adjustable to accommodate misalignment of ducts to be connected while minimizing the number of necessary sealing elements of the coupling.

Another object of the present invention is to provide a flexible coupling which is relatively simple in construction and assembly to assure ease and reliability in the secure coupling of fluid ducts.

One advantage of the present invention is that the coupling is relatively lightweight while including the design capability to accommodate axial, radial and angular misalignments.

One feature of the present invention is that each coupling half of the coupling is angled so that when one coupling is rotated or turned relative to the other coupling half, the center lines of the two ducts to be coupled are moved apart to provide for angular misalignments.

Another feature of the present invention is that both coupling halves are held together by an external, threaded collar providing sufficient clearance between the outer diameter of one of the coupling halves and the inside diameter of the collar to permit the coupling halves to slide relative to one another, thus providing for radial misalignments of one duct relative to another.

A principal feature of the present invention is the use of annular duct sealing elements which are always concentrically seated between the inner surface of each coupling half and the external surface of the associated duct. This concentric sealing arrangement is maintained irrespective of the position of the ducts relative to one another whether misaligned radially, angularly, or both. Thus, there is no undue axial load placed on the duct sealing element to affect the formation of a fluid tight seal between the duct and coupling half. Further, because there is no undue force on the sealing element, the duct is not rigid in the coupling, thus providing for conical flexibility.

In accordance with these and other objects, features and advantages of the present invention, there is provided a flexible coupling for fluid ducts when disposed end to end. The coupling includes a pair of complementary coupling half assemblies, each for encompassing an associated duct end to permit conical movement therebetween. Adjacent end faces of each assembly are disposed at an angle to the longitudinal center line of the associated coupling half assembly and each assembly includes an engagement complemental to the engagement of the other assembly. A connector, operative on said engagements for securing them one to another against relative movement, permits relative radial movement between assemblies prior to the secure coupling of the assemblies one to the other. Also included are duct sealing elements for engaging the inner surface of each assembly and the external surface of the associated duct to form a fluid tight seal therebetween while permitting both relative axial and angular movement between ducts.

In accordance with the present invention the connector comprises a collar having an inside diameter providing sufficient clearance between the external diameter of one of the assemblies and the collar to permit radial movement between assemblies prior to the secure coupling of the assemblies one to the other.

Further, in accordance with the present invention each duct sealing element comprises a sealing ring adjacent the end face of a half assembly for preventing passage of fluid under pressure from between the half assembly and the external surface of the associated duct; a first washer for abutting the end of the associated duct as well as an internal stop abutment adjacent the end face of each assembly; a second washer positioned so that the first and second washers are seated with the sealing ring therebetween and a retaining element for abutting the second washer to retain the first and second washers in place with the sealing ring in between. Preferably the first and second washers are split washers.

Additionally, the angle formed between the end face of one of the assemblies and the center line of the associated duct is the supplementary angle of the angle formed between the other end face and the center line of the associated duct of the other assembly.

Also in accordance with the present invention, one of the half assemblies is adapted so as to rigidly encompass a bulkhead fitting to prevent leakage between the assembly and the fitting.

These and other objects, features, and advantages of the invention will be apparent as the description proceeds with particular reference to the application drawings.

BEST MODE FOR CARRYING OUT THE INVENTION

Figure 1:
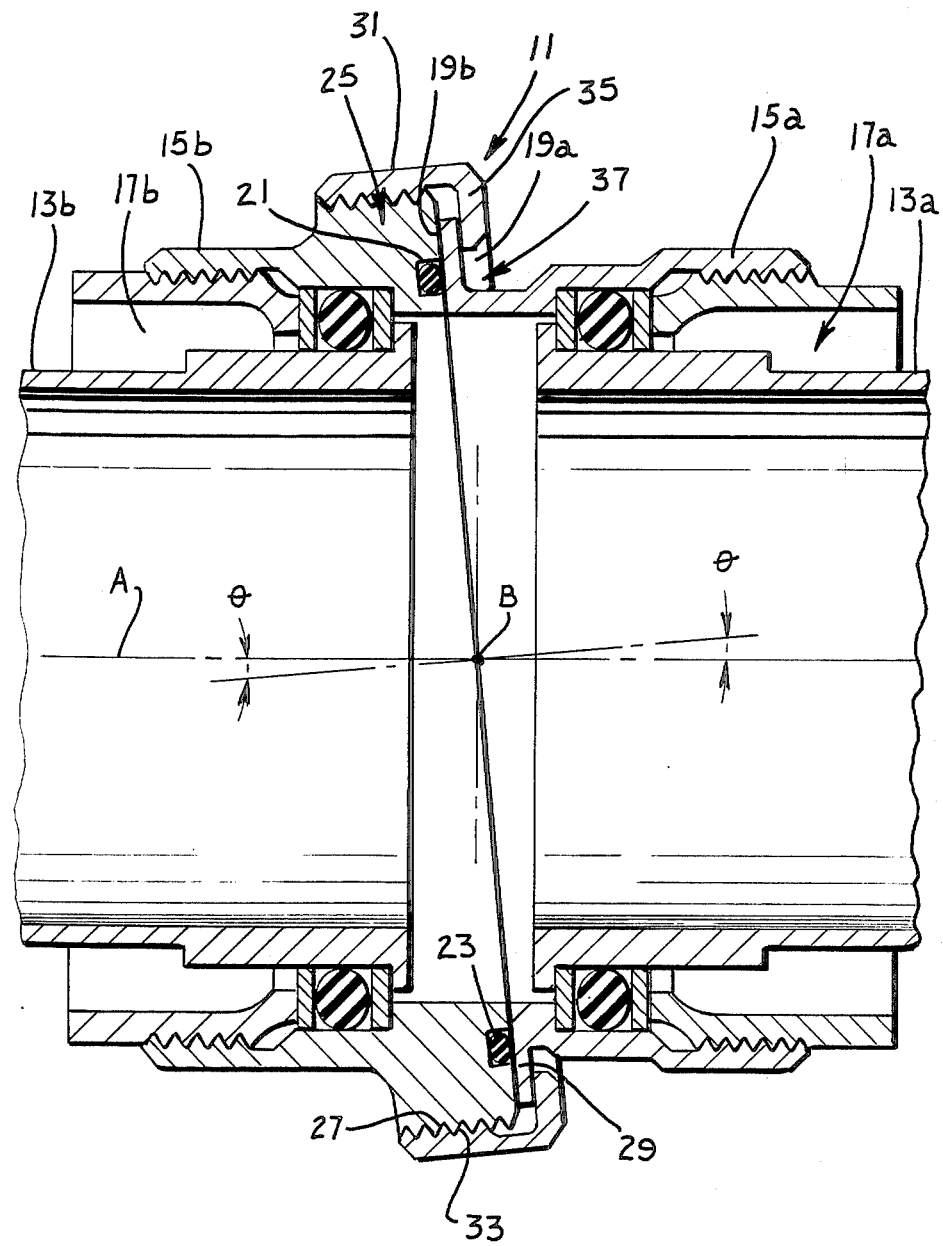
FIG. 1 is a sectional view through a flexible coupling constructed in accordance with the teachings herein and shown in engagement with the end portions of two aligned ducts secured thereby but capable of relative axial movement.

Referring to FIG. 1, a flexible coupling, generally indicated at 11, is illustrated for accommodating misalignments of beaded or flanged ducts 13a, 13b as well as for providing duct flexibility, that is, movement between coupled ducts. The coupling 11 is adjustable to accommodate misalignment in any one of any combination of three basic directions, these being axial, radial, and angular.

The coupling 11 comprises a pair of complementary coupling half assemblies 15a, 15b, each having a generally tubular configuration for encompassing the associate beaded or flanged duct 13a, 13b, respectively, so as to permit conical flexibility therebetween and provide for axial misalignments. This flexibility is permitted by providing a sufficient gap, generally located at 17a, 17b between ducts 13a, 13b and coupling half assemblies 15a, 15b, respectively.

Figure 2:
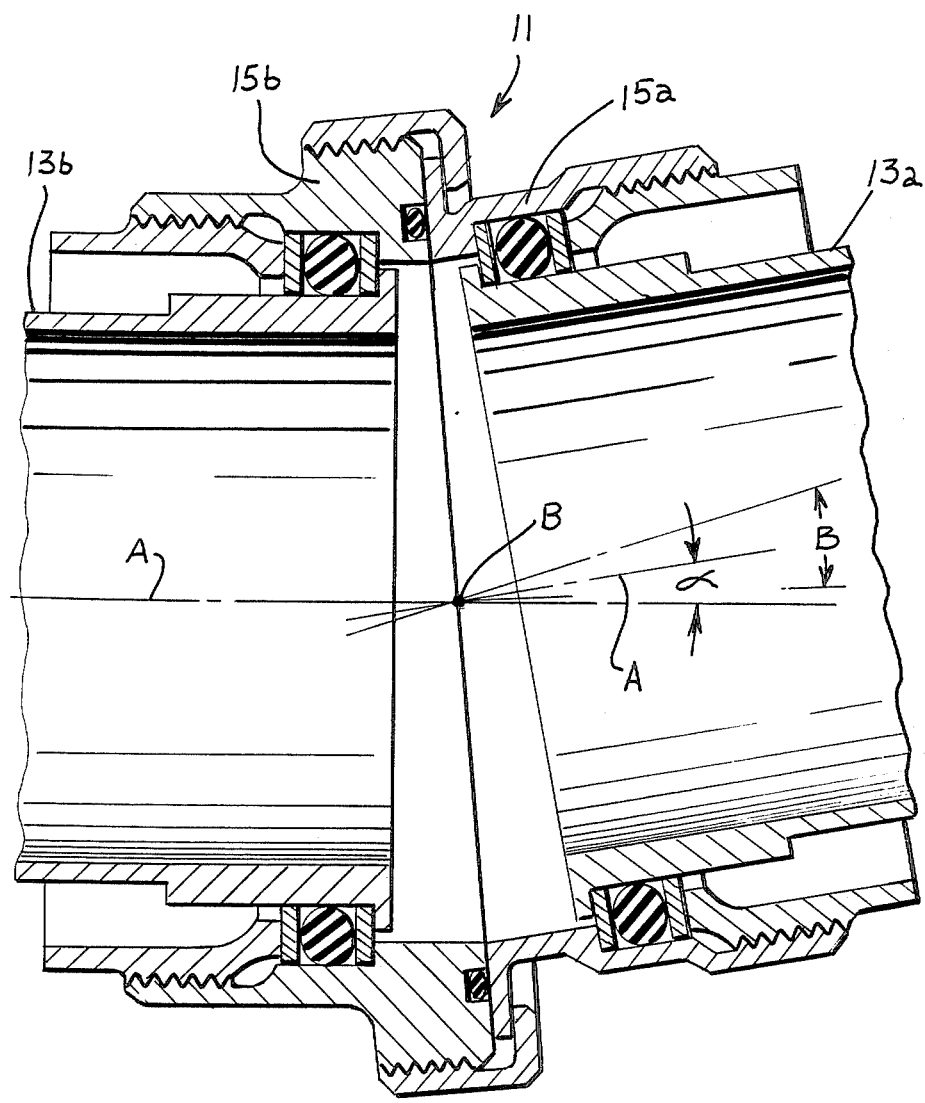
FIG. 2 is a similar view showing the position of the coupling assembly to accommodate the angular misalignment of the secured ducts as well as the conical flexing of which each duct is capable when connected by the coupling assembly.
Figure 4:
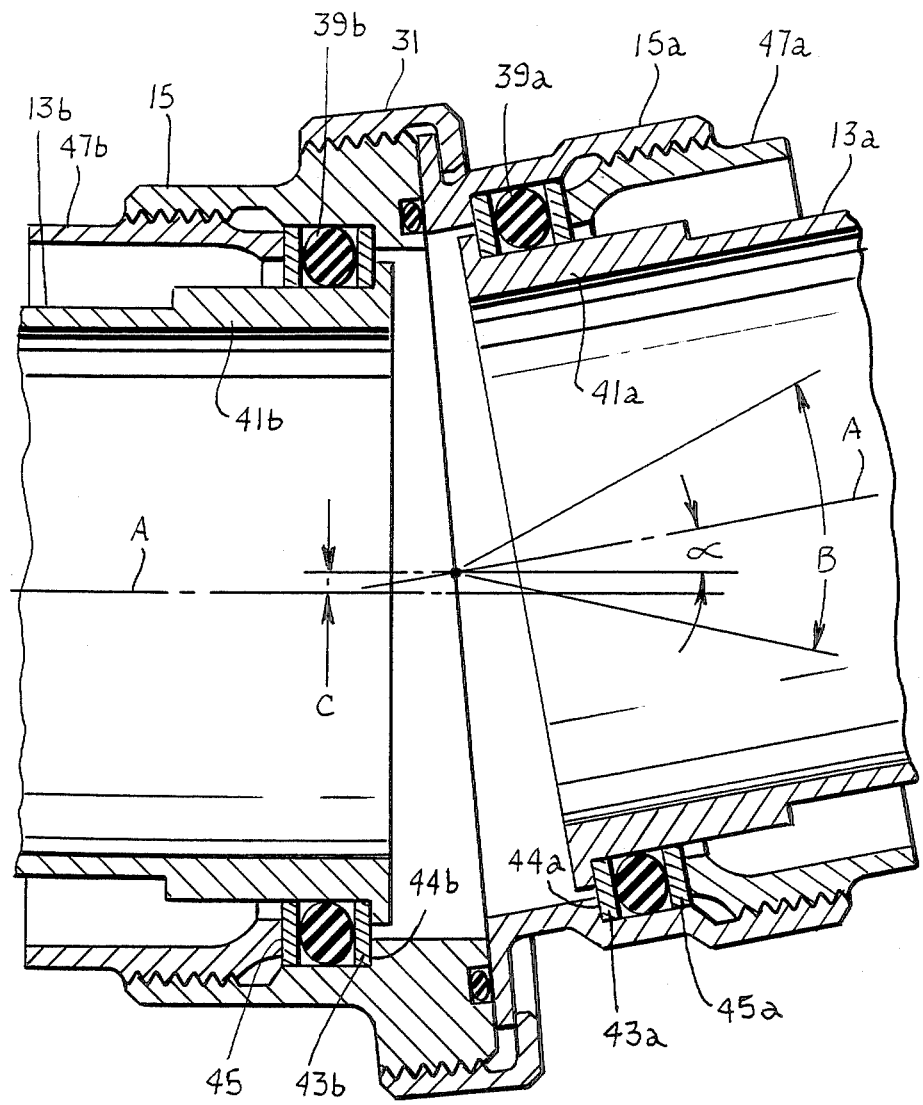
FIG. 4 is yet another sectional view of the flexible coupling of the present invention showing the position of the coupling elements to accommodate both angular and radial misalignment of the secured ducts.

Adjacent end faces 19a, 19b, of each assembly 15a, 15b, are disposed at an angle $\theta$ to the longitudinal center line A of the associated ducts 13a, 13b as aligned in FIG. 1 wherein center line A passes through the longitudinal center of each coupling half assembly 15a, 15b. As is illustrated by FIGS. 2 and 4, when one coupling half assembly 15 is rotated relative to the other, the center line A of each duct 13a, 13b pivots about center point B to provide for angular misalignments between ducts 13a, 13b, respectively. In the embodiment illustrated by FIG. 2, the degree of angular misalignment $\alpha$ which can be accommodated is about 10°; however, the parameter of $\alpha$ is determined by the angle $\theta$ and thus not limited to 10°. In addition to the angular misalignment $\alpha$, each duct 13a, 13b is permitted conical, flexibility $\beta$ on the order of about ±3° about axis A as shown in FIG. 2 and as will be more fully explained hereinafter with reference to FIG. 4.

One of the end faces 19 of the assemblies 15 includes a groove 21 for accommodating a sealing element 23. The sealing element 23 is, preferably, an annular, pliant member such as, for example, an O-ring.

Each assembly 15a, 15b also includes an engagement generally indicated at 25, as shown by FIG. 1, complemental to the engagement of the other assembly. As shown, the engagement preferably comprises a threaded portion 27 adjacent end face 19b of assembly 15b and a flanged portion 29 adjacent end face 19a of assembly 15a. A connector 31 is operative on the engagements 25 to secure them one to another against relative movement.

Figure 3:
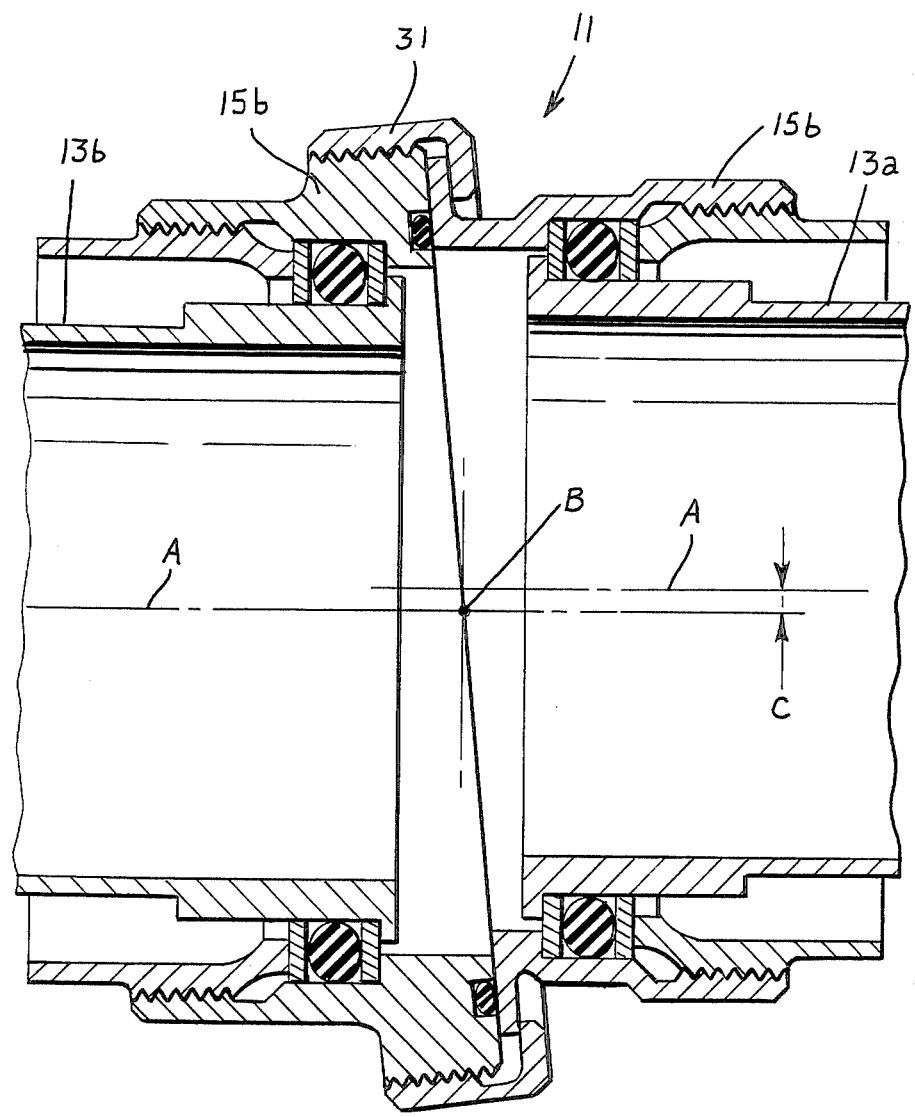
FIG. 3 is a sectional view illustrating the position of the coupling assembly for accommodating the radial misalignment of the secured ducts.

Preferably, the connector 31 comprises a collar having threads 33 for engaging assembly 15b threads 27 and a flange 35 for engaging flange 29 of assembly 15a. The inside diameter of the collar connector 31 provides sufficient clearance, generally indicated at 37, between the outside diameter of one assembly 15, for example, 15a, and the connector 31 to permit considerable radial movement C, as best seen in FIG. 3, between the connector 31 and the assembly 15a as well as between 15a and assembly 15b as shown by FIG. 3. Thus, when one coupling half assembly 15 is moved radially inside connector 31, prior to tightening of the connector, a radial misalignment of one duct 13 relative to the other duct 13 is obtained.

As shown by FIG. 4, the coupling 11 can accommodate both angular misalignments $\alpha$ as well as radial misalignments C of ducts 13a, 13b. Additionally, the coupling 11 permits relative conical flexing or movement between ducts 13a, 13b as will be explained with reference to FIG. 4 to provide for axial misalignments.

A principal feature of the present invention is that duct sealing elements 39a, 39b, respectively, are always concentrically seated between the outside diameter of ducts 13a, 13b and the inside diameter of coupling half assemblies 15a, 15b, respectively. This condition is irrespective of the position of ducts 13a, 13b relative to each other whether misaligned radially, angularly, or both. Therefore, there is no undue axial load placed on the duct sealing elements 39 to prevent a satisfactory seal between ducts 13 and coupling half assemblies 15.

Referring to FIG. 4, each duct sealing element 39 comprises a sealing ring adjacent the end face 19 of each assembly 15 which serves to prevent passage or leakage of fluid under pressure from between the assembly 15 and the external surface of each duct 13. As shown, duct sealing element 39 is an O-ring; however, any other suitable form of packing or sealing ring may be employed. These rings are formed of rubber, synthetic rubber, appropriate plastic, or the like, to have the selected or required hardness, resiliency, flexibility and other physical characteristics and are round or circular in transverse cross-section, although other shapes can be used.

Each duct sealing element 39 is arranged within each assembly 15 adjacent the respective end face of that assembly. A first washer 43 abuts the flange 41 of the associated duct 13 as well as an internal stop abutment 44 adjacent each end face 19 of each assembly 15. Washer 43 serves to prevent excessive distortion or extrusion of the duct sealing element 39 and is sectional or split to be readily sprung over the adjacent end of an associated duct flange. A second washer 45 is positioned so that first and second washers 43, and 45, are seated on either side of the duct sealing element 39. Similarly, washer 45 is a split ring so as to fit over the associated flange 41 of the associated duct. As will be apparent, washer 45 also serves to prevent excessive distortion or extrusion of the related or adjacent sealing element 39. The washers 43, 45 are proportioned to have little or no radial play or motion with the associated coupling assembly 15. The sealing elements 39 are proportioned to be under initial light compression between the internal surface of assembly 15 and external surface of the associated duct 13.

Retaining elements 47a, 47b abut washers 45a, 45b, respectively, and comprise threaded ring nuts with a mating screw thread in the associated half assembly 15 so that the ring nuts fit inside the assembly 15. Alternatively, the retaining element 47 comprises a spring ring and associated groove in the respective assembly 15. Because there is no undue force on the sealing elements 39, the duct 13 is not rigid in the associated coupling assembly 11 and this provides conical flexibility $\beta$, about the center line A, on the order of $\pm 3°$ in addition to the angular misalignment capability $\alpha$. Retaining elements 47a and 47b are identical in certain instances.

Figure 5:
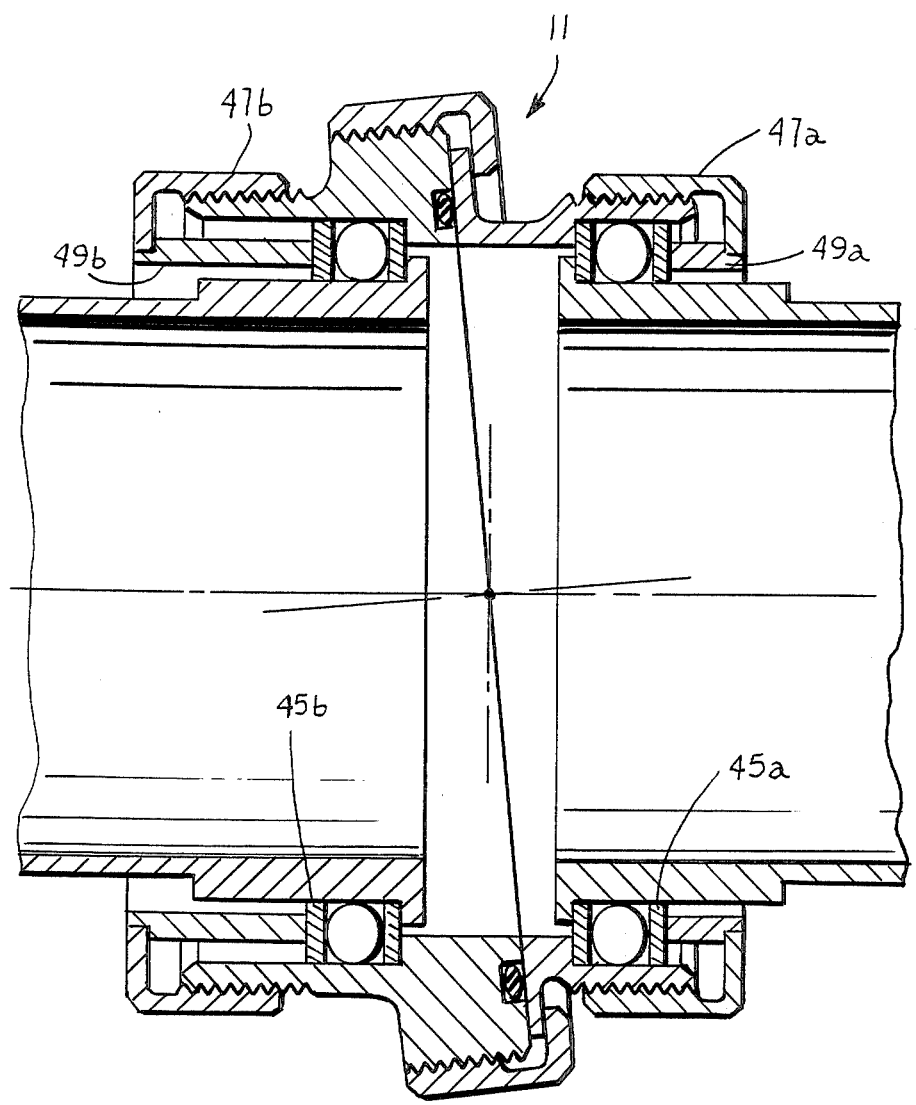
FIG. 5 is a sectional view of one embodiment of the present invention wherein the duct retaining elements are externally fitted nuts.

FIG. 5 illustrates an alternative embodiment of the coupling 11 wherein the retaining elements 47 comprise external, threaded nuts each having an in-turned annular part 49 for cooperating with the adjacent washer 45. The embodiment of FIG. 5 uses all the other features of the coupling 11 as previously described and achieves the same result in a slightly smaller envelope. Retaining elements 47a and 47b are identical in some instances.

Figure 6:
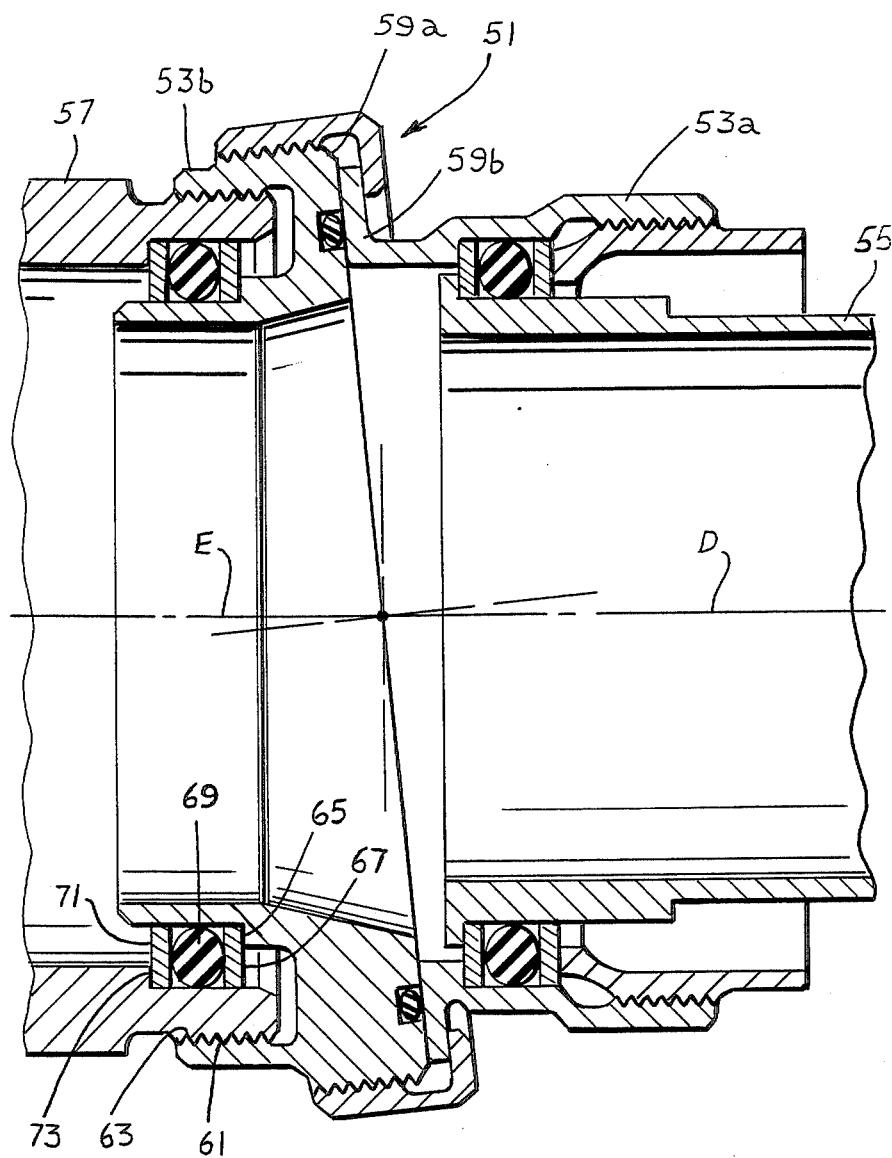
FIG. 6 is yet another sectional view illustrating an alternative embodiment of the present invention including a half coupling assembly and adaptor for existing bulkhead installation.

FIG. 6 illustrates yet another embodiment of the present invention adapted for use with a standard bulkhead-type connection. The bulkhead coupling, generally indicated at 51, comprises a pair of complementary coupling half assemblies, 53a, 53b. One of the assemblies 53a encompasses an associated duct end 55 so as to permit conical movement therebetween while the other assembly 53b is an adapter piece for transition between the regular bulkhead fitting 57 and the half assembly 53a. Adjacent end faces 59a, 59b are disposed at an angle, face 59a to the center line D of duct 55 and face 59b at an angle to center line E.

Assembly 53b has a threaded portion 61 for engaging the threaded end 63 of the bulkhead fitting 57. An internal stop abutment 65 is provided adajcent the bulkhead fitting facing end of assembly 53b. A second washer 67 abuts the stop 65 and sealing element 69 while a second washer 71 abuts an internal stop 73 adjacent the end of bulkhead fitting 57. This arrangement proves an effective and rigid seal between the fitting 57 and half assembly 53b. All other components of the coupling 51 are as previously described, it being understood that the variations illustrated by FIG. 5 can also be used as well as a transposition of the half assembles 53a, 53b.

Figure 7:
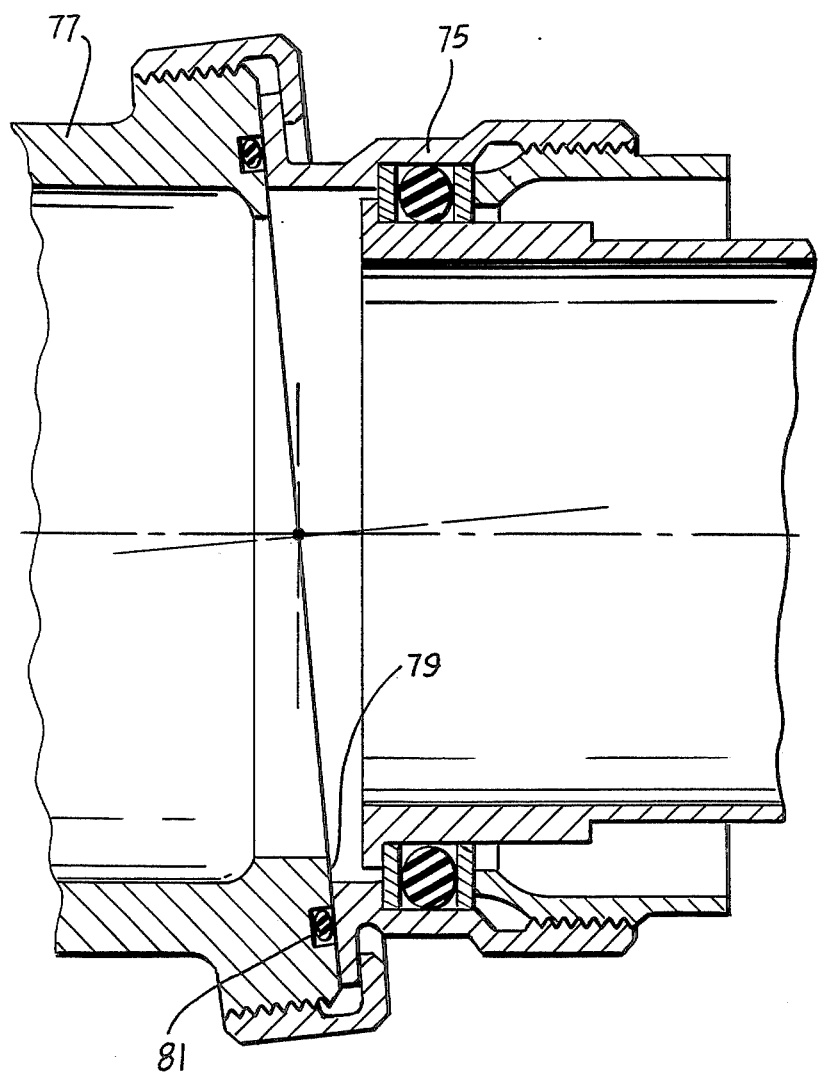
FIG. 7 illustrates another embodiment of the present invention for application to adapted bulkhead installations.

FIG. 7 illustrates the use of a half coupling 75 with an adapted bulkhead fitting which incorporates an angular face 79 and seal ring groove 81 thereby eliminating the necessity for the adaptor illustrated by FIG. 6.

Figure 8:
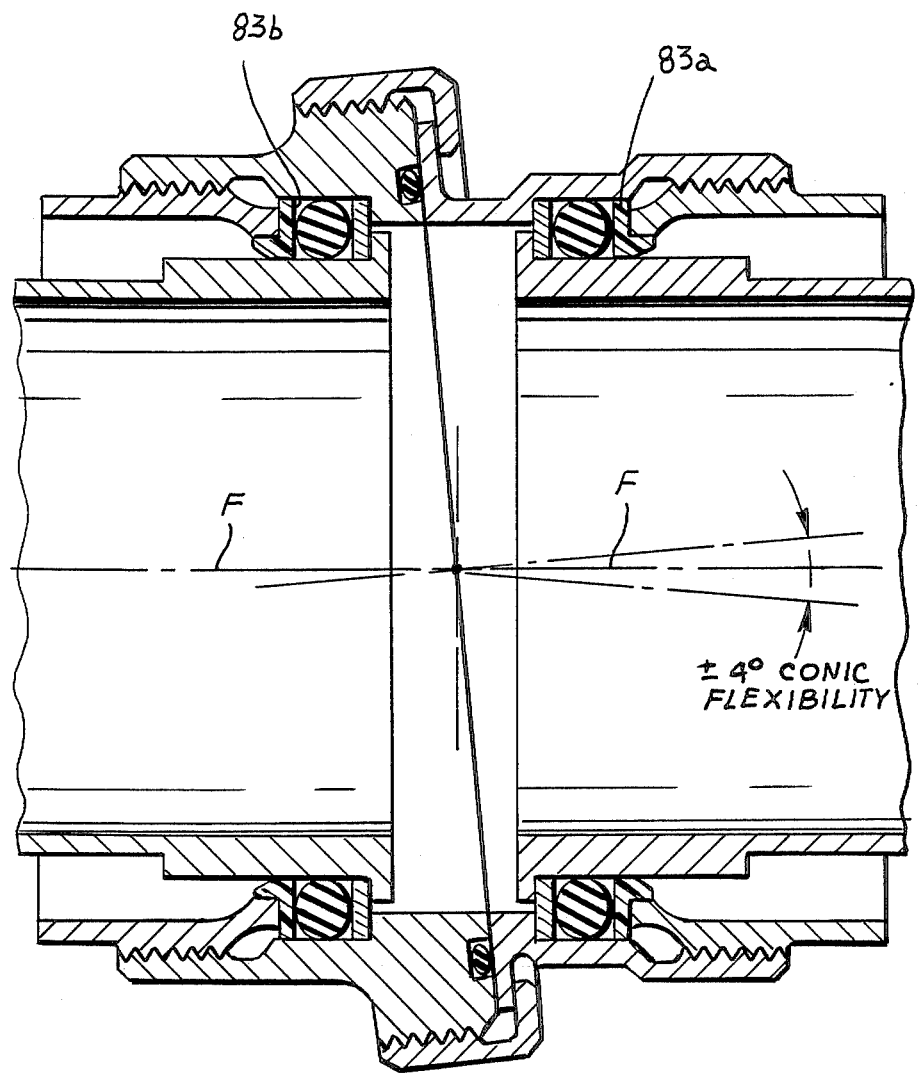
FIG. 8 shows still another embodiment of the coupling of the present invention wherein low friction back-up rings are employed and conical flexibility provided on the order of about ±4°.

FIG. 8 illustrates yet another embodiment of the coupling of the present invention so as provide conical flexibility $\beta$ on the order of about $\pm 4°$ about center line F. Here a split, low friction back-up ring 83 is employed which is specially shaped to provide an anti-wear capability so that the conical flexibility $\beta$ may exceed $\pm 3°$. This embodiment is applicable to all embodiments of the coupling of the present invention.

Figure 9:
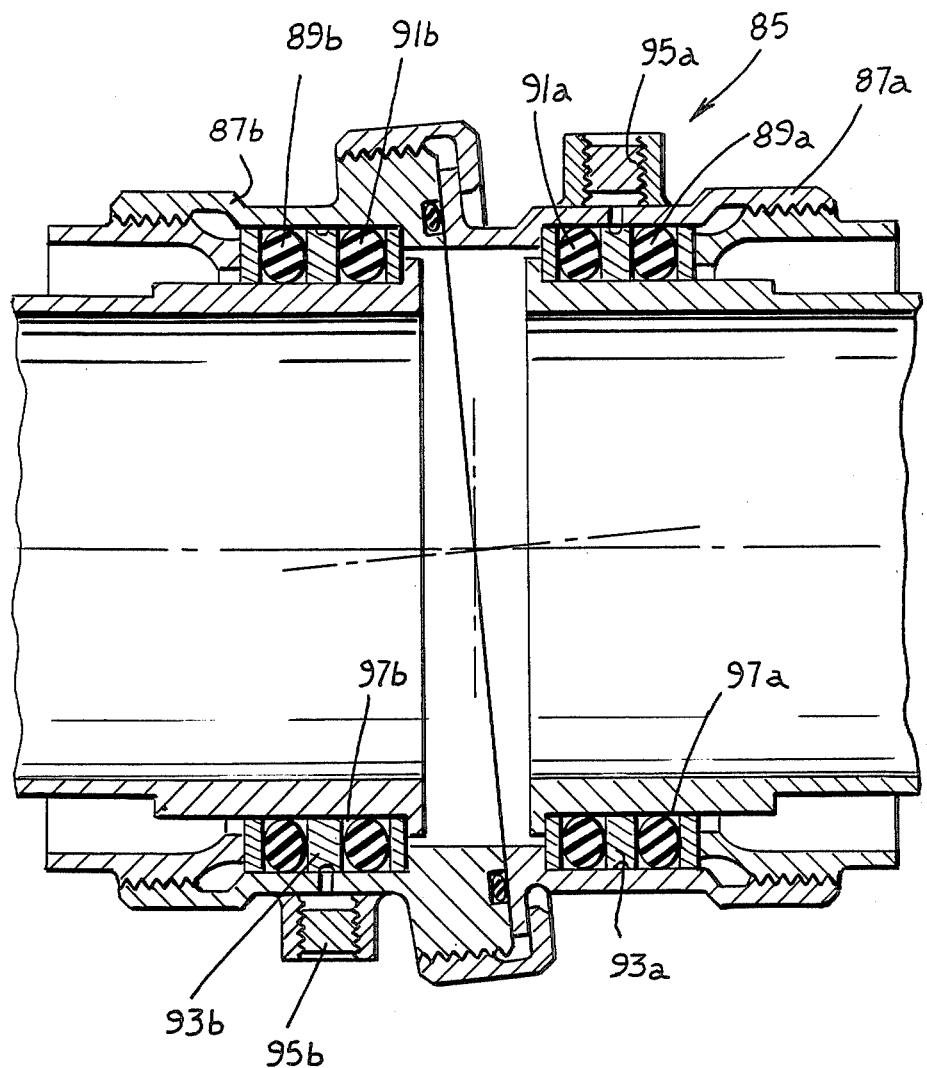
FIG. 9 illustrates still a further embodiment of the present invention utilizing a double seal arrangement with an interseal drain.

FIG. 9 illustrates the basic design of the coupling of the present invention adapted for a double seal version with inter-seal drain capabilities. The coupling, generally indicated at 85, is similar to the basic coupling described in FIG. 1–4 except that in each coupling half 87a, 87b, there are two seals 89, 91 with a spacer 93 therebetween. A means 95 to drain the cavity 97 between seals 89, 91 is provided in the form of a standard boss.

Having described only typical forms of the invention, I do not wish to be limited to the specific details herein set forth, but wish to reserve any variations or modifications that may appear to those of ordinary skill in the art and fall within the scope of the appended claims.

I claim:

1. A flexible coupling for fluid ducts having outwardly extending flanges at the ends thereof comprising:
   (a) a pair of complementary coupling half assemblies, each having a generally tubular configuration arranged for slidably mounting over the end of one of the fluid ducts to be coupled with sufficient clearance between the inside of said coupling half assembly and the outside of the associated duct to permit conical movement therebetween;
   (b) duct sealing means mounted in each of said coupling half assemblies for encircling the duct on which said half assembly is mounted to secure the duct to said half assembly and for sealing the clearance between the outside of said encircled duct and the inside of said half assembly while permitting conical and axial movement therebetween;
   (c) adjacent end faces of each half assembly extending outwardly to form flanges abutting together in a plane disposed at an angle to the longitudinal center line of the associated half assembly;
   (d) one of said flanges of said half assemblies having threads on the peripheral surface thereof; and
   (e) a connector for securing one half assembly to the other, said connector being an annular collar having threads on the interior for mating with said threads of said one of said flanges and having an inwardly extending circular flange for engaging said flange without threads, the inside diameter of said collar providing sufficient clearance between the external diameter of said flange without threads and said collar to permit radial and rotational movement between each half coupling assembly prior to the secure coupling of said assemblies one to the other.

2. A flexible coupling according to claim 1, wherein each duct sealing element comprises:
   (a) a resilient sealing ring for preventing passage of fluid under pressure from between said half assembly and the associated duct;
   (b) a first washer for abutting the end of the associated duct so as to engage the inside surface of the outwardly extending flange of the duct as well as an internal stop abutment adjacent the end face of each half assembly;

(c) a second washer positioned so that said first and second washers are seated with said sealing ring therebetween; and (d) a retaining element for abutting said second washer so as to exert an axial load on said first and second washers with said sealing ring in between.

3. A flexible coupling according to claim 2, wherein said retaining element comprises a threaded ring nut with a mating screw thread in the associated half assembly.

4. A flexible coupling according to claim 3, wherein one of said faces of said assemblies includes a groove for accommodating a sealing element.

5. A flexible coupling according to claim 4, wherein the angle formed between the end face of said assemblies and the longitudinal center line of the associated coupling half assembly is the supplemental angle of the angle formed between the other end face and the longitudinal center line of the other assembly.

* * * * *